US012789934B2

(12) United States Patent
Fremaux

(10) Patent No.: US 12,789,934 B2
(45) Date of Patent: Nov. 10, 2026

(54) METHOD FOR DETECTING MEASUREMENT ERRORS IN THE ANGLE OF INCLINATION OF A TWO-WHEELED VEHICLE

(71) Applicant: Schaeffler Technologies AG & Co. KG, Herzogenaurach (DE)

(72) Inventor: Jean-Luc Fremaux, Toulouse (FR)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 19/265,756

(22) Filed: Jul. 10, 2025

(65) Prior Publication Data

US 2026/0054793 A1 Feb. 26, 2026

(30) Foreign Application Priority Data

Aug. 21, 2024 (FR) ........................................ 2409014

(51) Int. Cl.
*B62J 45/41* (2020.01)
*B62H 1/06* (2006.01)
(Continued)

(52) U.S. Cl.
CPC ............ *B62J 45/4151* (2020.02); *B62H 1/06* (2013.01); *B62J 50/22* (2020.02); *B62M 7/04* (2013.01); *G01C 9/06* (2013.01); *G07C 5/0808* (2013.01)

(58) Field of Classification Search
CPC ...... B62J 45/4151; B62J 50/22; B62J 45/415; B62J 45/00; B62J 50/21; B62H 1/06;
(Continued)

(56) References Cited

U.S. PATENT DOCUMENTS

| | | | |
|---|---|---|---|
| 5,617,337 | A | 4/1997 | Eidler et al. |
| 6,519,515 | B1 | 2/2003 | Baumann et al. |

(Continued)

FOREIGN PATENT DOCUMENTS

| | | | |
|---|---|---|---|
| CN | 116022698 | A | 4/2023 |
| DE | 19844911 | B4 | 1/2006 |

(Continued)

OTHER PUBLICATIONS

Formentin Simone et al., "Fault detection in roll angle estimation for two-wheeled vehicles", 5th IFAC Symposium on Modelling and Control in Biomedical Systems 2003, Melbourne, Australia, Aug. 21-23, 2003, vol. 45, No. 24, Sep. 1, 2012, 6 pages.

(Continued)

*Primary Examiner* — Joseph J Dallo
(74) *Attorney, Agent, or Firm* — NIXON & VANDERHYE

(57) ABSTRACT

The invention relates to a method for detecting measurement errors in the lateral angle of inclination (θ) of a two-wheeled vehicle (1), comprising the steps of:
- in a first phase, checking (E3) that the engine (10) of the vehicle (1) is stopped;
- if the engine (10) is stopped, comparing (E6) the measurements of the inclination sensor (111) relative to the at least one reference inclination range;
- if the electronic control unit (11) determines that the measurements are outside the reference range, detecting an error in the measurement of the angle of inclination (θ);
- in a second phase, starting (E7) the engine (10) of the vehicle (1);
- computing (E8) the variation in the measurements of the inclination sensor (111) while the engine (10) is running;

(Continued)

if the variation in the measurements of the inclination sensor (111) is below a predetermined threshold for a predetermined duration, detecting (E9) an error in the measurement of the angle of inclination (θ).

10 Claims, 3 Drawing Sheets

(51) Int. Cl.

| | |
|---|---|
| ***B62J 45/415*** | (2020.01) |
| ***B62J 50/22*** | (2020.01) |
| ***B62M 7/04*** | (2006.01) |
| ***G01C 9/06*** | (2006.01) |
| ***G07C 5/08*** | (2006.01) |

(58) Field of Classification Search

CPC .......... B62M 7/04; G01C 9/06; G07C 5/0808; B60W 2050/143; B60W 2520/105; B60W 50/14; B60W 2050/021; B60W 2300/36; B60W 2520/125; B60W 2520/18; B60W 50/0205; B60K 28/14; B60Y 2200/12

See application file for complete search history.

(56) References Cited

U.S. PATENT DOCUMENTS

| | | | | |
|---|---|---|---|---|
| 7,124,852 | B2 | 10/2006 | Hasegawa | |
| 8,401,730 | B2 | 3/2013 | Bechtler et al. | |
| 2006/0020385 | A1* | 1/2006 | Kakinuma | B60K 28/14 701/112 |
| 2009/0177425 | A1 | 7/2009 | Sugihara et al. | |
| 2010/0044977 | A1* | 2/2010 | Hughes | B62K 5/10 280/5.509 |
| 2012/0173042 | A1 | 7/2012 | Takenaka et al. | |
| 2017/0058808 | A1* | 3/2017 | Gennard | G01C 9/00 |
| 2018/0118197 | A1* | 5/2018 | Kim | B60W 40/076 |
| 2018/0216545 | A1* | 8/2018 | Kurata | F02B 61/02 |
| 2019/0176622 | A1* | 6/2019 | Suzuki | B60K 28/14 |
| 2019/0241118 | A1* | 8/2019 | Fukunaga | F21S 41/657 |
| 2020/0331553 | A1* | 10/2020 | Kurata | G01G 19/44 |
| 2022/0348188 | A1 | 11/2022 | Green et al. | |
| 2023/0100346 | A1* | 3/2023 | Zilberman | G07C 5/0816 342/357.32 |

FOREIGN PATENT DOCUMENTS

| | | | | | |
|---|---|---|---|---|---|
| DE | 102022206348 | A1 | | 12/2023 | |
| TW | I814865 | B | | 9/2023 | |
| WO | WO-2005075278 | A1 | * | 8/2005 | B62D 9/02 |
| WO | WO-2007127783 | A1 | * | 11/2007 | B62K 5/027 |
| WO | WO-2011124546 | A1 | * | 10/2011 | G07C 5/008 |
| WO | WO-2015124634 | A1 | * | 8/2015 | B60W 30/18027 |
| WO | WO-2018047663 | A1 | * | 3/2018 | B60R 21/00 |
| WO | WO-2019229664 | A1 | * | 12/2019 | B60K 15/03519 |
| WO | WO-2020011900 | A1 | * | 1/2020 | B62J 45/4151 |
| WO | WO-2022197835 | A1 | * | 9/2022 | E02F 9/2203 |
| WO | WO-2023177457 | A1 | * | 9/2023 | E21B 44/04 |

OTHER PUBLICATIONS

French Search Report for FR2409014 dated Feb. 11, 2025, 6 pages.

Office Action, issued in Taiwanese Patent Application No. 114126333 dated Mar. 26, 2026.

* cited by examiner

[Fig 1]
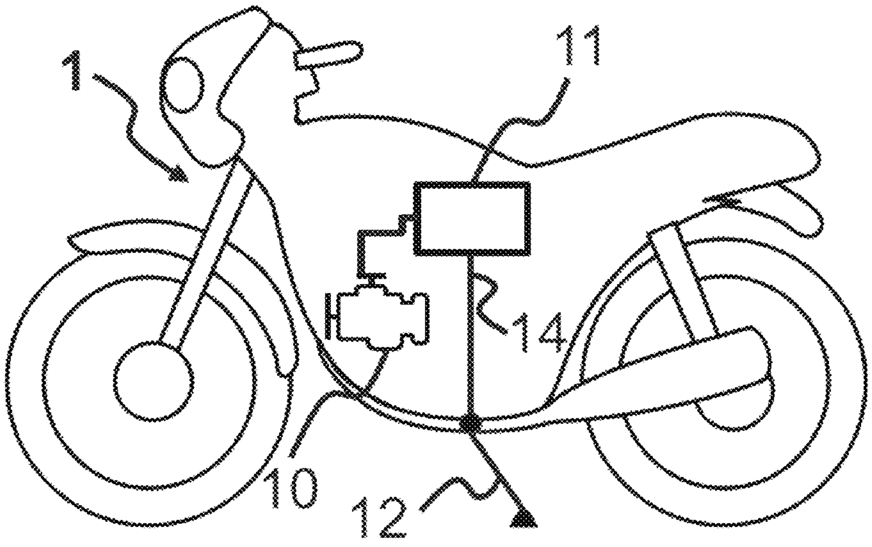
[Fig 2]
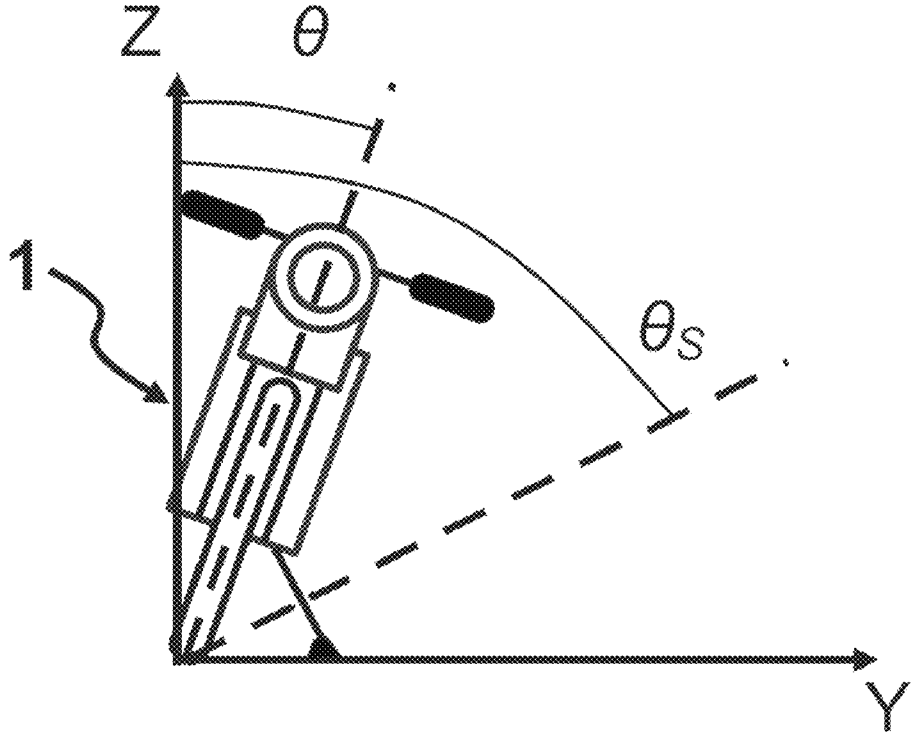

[Fig 3]
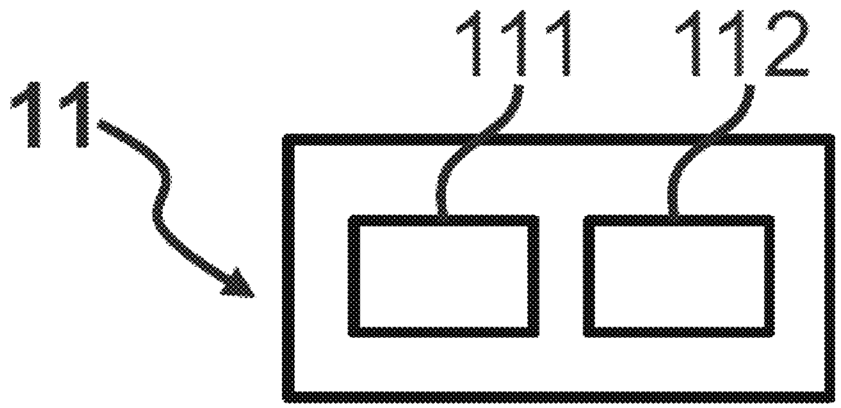

[Fig 4]
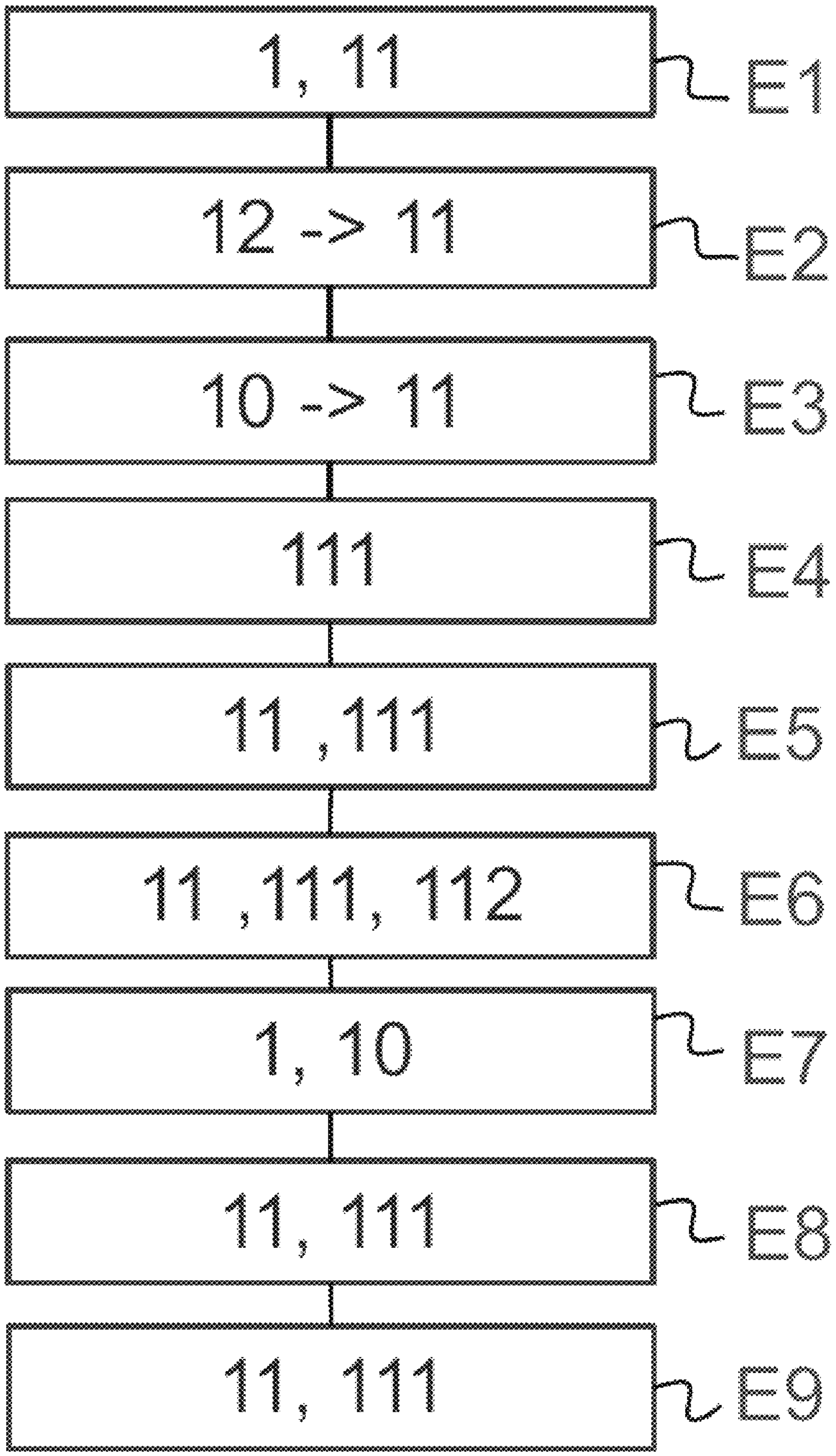

METHOD FOR DETECTING MEASUREMENT ERRORS IN THE ANGLE OF INCLINATION OF A TWO-WHEELED VEHICLE

TECHNICAL FIELD

The present invention relates to the field of motorized two-wheeled vehicles and more specifically relates to measuring the lateral inclination of the vehicle.

PRIOR ART

In order to improve driver safety, many motorized two-wheeled vehicles are currently equipped with systems that can directly act on the operation of the vehicle, without the intervention of the driver, as soon as a critical situation is detected.

As is well known, motorized two-wheeled vehicle manufacturers include inclination sensors in these vehicles that notably measure the lateral inclination of the two-wheeled vehicle. These sensors are configured to have a maximum inclination threshold, above which the vehicle is considered to be falling, triggering the engine to stop and thus ensuring the safety of the driver.

For example, if this threshold is 60° relative to a vertical direction defined by the earth's gravity, and the effective angle of inclination of the two-wheeled vehicle is beyond 60°, the vehicle is considered to be falling and the engine is stopped.

This device also prevents the engine from starting if the vehicle is inclined beyond this threshold when the user starts it up.

A first generation of inclination sensors is mechanical and attached to the vehicle chassis. These sensors contain weights (for example, balls) that move according to the inclination of the vehicle and close electrical contacts when a given inclination is reached. The inertia of these weights then determines the sensitivity of the sensor to the inclination of the vehicle and, furthermore, the precision of the angle measurement.

However, these sensors are bulky and involve significant constraints in terms of attachment on the vehicle chassis. For these reasons, a new generation of sensors is used, made up of an electronic control unit that contains a MEMS (Micro Electro Mechanical System) type accelerometer.

This sensor can be placed anywhere in the vehicle depending on the design thereof. However, depending on the position of the sensor in the vehicle, the sensor is subject to the effects of wear that are related, for example, to high temperatures and vibrations, which are even greater for vehicles in which the sensor is attached to the engine or even in its vicinity. Electromagnetic interference, caused by vehicle components or even by external sources, can also disrupt the sensor and also cause the effects of wear.

These effects of wear can cause enough damage to the mechanical parts of the MEMS type accelerometer that they become blocked. These parts, since they are no longer movable, will then measure a constant value for the corresponding inclination component, irrespective of the movements of the sensor and the actual inclination of the vehicle, thus distorting the measured angle of inclination.

Based on a distorted measurement of the angle of inclination of the vehicle, the electronic control unit can then trigger the function for stopping the engine even if the vehicle is at an acceptable inclination, which presents significant risks for a user of said vehicle.

Therefore, a requirement exists for a simple and effective solution for at least partly overcoming these disadvantages.

DISCLOSURE OF THE INVENTION

To this end, the initial aim of the invention is a method for detecting measurement errors in the lateral angle of inclination of a motorized two-wheeled vehicle, said vehicle comprising an engine and an electronic control unit, said electronic control unit comprising an inclination sensor and a memory zone, said memory zone comprising at least one reference inclination range, said electronic control unit being configured to compute the lateral angle of inclination of the vehicle based on the measurements of the inclination sensor, to compare the measured angle of inclination with a predetermined inclination threshold and to send a command to stop the engine if the measured angle of inclination is greater than the inclination threshold, said method comprising the steps of:

- activating the electronic control unit through an action by a user of the vehicle;
- in a first phase, the electronic control unit checking that the engine of the vehicle is stopped via the communication link;
- if the engine is stopped, the electronic control unit comparing the measurements of the inclination sensor relative to the at least one reference inclination range;
- if the electronic control unit determines that the measurements of the inclination sensor are outside the reference range, detecting an error in the measurement of the angle of inclination and the electronic control unit deactivating the sending of the command to stop the engine according to the angle of inclination of the vehicle and warning the user;
- in a second phase, starting the engine of the vehicle through an action by a user of the vehicle, and the electronic control unit receiving notification of the engine starting;
- the electronic control unit computing the variation in the measurements of the inclination sensor when the engine is running;
- if the variation in the measurements of the inclination sensor is below a predetermined threshold for a predetermined duration, detecting an error in the measurement of the angle of inclination and the electronic control unit deactivating the function for stopping the engine according to the angle of inclination of the vehicle and warning the user.

The method according to the invention thus allows a blockage of a component of the inclination sensor to be detected in two phases. Firstly, by comparing the measurements of the inclination sensor with a reference range when the vehicle is stopped, providing a first index indicating whether these values are false relative to the values of the reference range. Then, in a second phase, using the vibrations produced by the running engine, which normally cause oscillations in the measurements of the inclination sensor. The absence of these oscillations in the measurements therefore indicates a blocked component. This second phase provides redundancy in relation to the first phase, because it is possible that a component of the inclination sensor is blocked in a position that nevertheless provides a correct inclination when stopped. If a blockage is detected, the user then needs to be notified because the computation of the angle of inclination is then no longer reliable, and the detection of a fall is distorted.

Preferably, the measurements of the inclination sensor involve projecting the earth's gravity on three axes, with the electronic control unit being configured to compute the angle of inclination based on the three projections determined by the inclination sensor, and the method comprises:

the step of comparing the measurements of the inclination sensor relative to the reference ranges carried out on each of the three projections;

the step of determining the deviation of the measurements of the inclination sensor relative to the reference inclination ranges carried out based on the deviation of at least one projection from a corresponding reference value;

the step of computing the variation in the measurements of the inclination sensor while the engine is running carried out on the computation of the variation in the measurement of each of the three projections; and the step of deactivating the function for stopping the engine according to the angle of inclination of the vehicle carried out if the variation in at least one projection is less than a predetermined threshold for a predetermined duration.

This type of inclination sensor is the most common and includes specific components for each measurement axis, so that the measurement on one axis can be correct but distorted on the other axes.

Advantageously, a step of determining the contribution of each of the three axes to the computation of the angle of inclination is carried out by the electronic control unit before the step of comparing the measurements of the inclination sensor relative to the reference inclination ranges, the step of deactivating the function for stopping the engine according to the measurements of the inclination sensor of the vehicle and of warning the user is only carried out if the deviation of at least one projection of an axis determined as being a contributor relative to a corresponding reference value is greater than an error margin, or if the computation of the variation in the measurements of the inclination sensor of at least one projection of an axis determined as being a contributor while the engine is running is below a predetermined threshold for a predetermined duration. This determination of the contribution is used to differentiate between cases where the blockage directly affects the measurement of the angle of inclination via a contributing axis and cases where the blockage is on a non-contributing axis. In both cases, the inclination sensor has a problem and must be repaired or replaced, and the user is therefore warned. However, as a problem on a non-contributing axis does not significantly influence the computation of the angle of inclination, in this case it is worthwhile retaining the function for stopping the engine since the determination of the angle of inclination is still correct.

Advantageously, the reference inclination values are measured and stored in the memory zone of the electronic control unit when the vehicle is produced. This storage then occurs at the same time as the various calibrations of the electronic control unit of the vehicle.

In a preferred operating mode, the step of computing the variation in the measurements of the inclination sensor is carried out based on the difference between two successive iterations of the measurements of the inclination sensor. This is a simple and effective way of controlling measurement oscillations.

Advantageously, in this operating mode, the difference between two successive iterations of the measurements of the inclination sensor is multiplied by a predefined time constant before the step of comparing with at least one reference value. This amounts to computing the time derivative of the measurement, with a zero derivative meaning a constant measurement despite the vibrations caused by the operation of the engine. Adjusting the time constant allows the signals to be amplified to ensure that variations are detected. This derivative can be zero even when vibrations are present, but only occasionally. For this reason it is all the more relevant to detect a blockage if the derivative is zero for a predetermined time.

As a variant or in addition, the vehicle comprises a retractable stand and a step of controlling the deployment of the stand is carried out after activating the electronic control unit, the step of comparing the measurements of the inclination sensor relative to at least one reference range is only carried out if the engine is stopped and the stand is deployed. This stand ensures that the vehicle is in a fixed and repeatable position for comparing measurements before the engine is started, with a known angle of inclination and a reference range taking into account the effects of wear on the stand or the inclination of the ground, for example.

According to another aspect, the invention also relates to an electronic control unit for a motorized two-wheeled vehicle, configured to be connected to the engine of said vehicle via a communication link and comprising an inclination sensor and a memory zone, said memory zone comprising reference inclination ranges, said electronic control unit being configured to:

compute the lateral angle of inclination of the vehicle based on the measurements of the inclination sensor;

compare the measured angle of inclination with a predetermined inclination threshold;

send a signal to stop the engine via the communication link if the measured angle of inclination is greater than the inclination threshold;

determine whether the vehicle engine is stopped or running;

compare the measurements of the inclination sensor relative to the reference inclination ranges;

compute the variation in the measurements of the inclination sensor while the engine is running;

deactivate the function for stopping the engine according to the angle of inclination of the vehicle and send a warning to the vehicle user.

Advantageously, the inclination sensor of the electronic control unit as described is configured to automatically carry out a series of self-diagnostics. These self-diagnostics allow an initial indication to be provided concerning the blockage of components of the inclination sensor, but may not be sufficient. Therefore, both phases of the method as described are necessary to ensure reliability in terms of detecting a blockage.

According to another aspect, the invention also relates to a motorized two-wheeled vehicle, comprising an electronic control unit as described.

DESCRIPTION OF THE DRAWINGS

Further features and advantages of the invention will become more clearly apparent upon reading the following description. This description is purely illustrative and should be read with reference to the appended drawings, in which:

FIG. 1 schematically illustrates a motorized two-wheeled vehicle in which the method according to the invention is applied;

FIG. 2 schematically illustrates the angle of inclination of the vehicle;

FIG. 3 schematically illustrates an electronic control unit of the vehicle;

FIG. 4 schematically illustrates the sequence for the method according to the invention.

DESCRIPTION OF THE EMBODIMENTS

The error detection method according to the invention is applied to a motorized two-wheeled vehicle 1 as illustrated in FIG. 1.

Vehicle 1

As shown in FIG. 1, the vehicle 1 comprises an engine 10, an electronic control unit 11, a stand 12 and a communication link 14.

The vehicle 1, whether stationary or moving, forms an angle of inclination θ with the earth's vertical Z, as shown in FIG. 2.

Engine 10

The engine 10 allows the torque to be produced that is required to drive the wheels of the vehicle 1 when the vehicle 1 is moving.

When the engine 10 is running, notably following an action by a user of the vehicle 1, the engine 10 drives the rotation of a shaft for a certain number of rotations per minute, also called engine speed.

The rotation of this shaft produces vibrations in the engine 10 that are propagated in the vehicle 1, notably in the electronic control unit 11 when it is mounted in the vicinity of the engine 10.

Electronic Control Unit 11

As shown in FIG. 3, the electronic control unit 11 comprises an inclination sensor 111 and a memory zone 112.

The inclination sensor 111 is preferably a MEMS type accelerometer, configured to compute the projection of the earth's gravity on three axes of a reference frame based on the movement of components inside the inclination sensor 111.

These components can become blocked, notably due to wear and external stresses, and therefore are no longer able to move.

The reference frame of the inclination sensor 111 is an intrinsic reference frame, i.e., it solely depends on the arrangement of the components inside the inclination sensor 111.

The electronic control unit 11 is configured to compute the lateral angle of inclination θ of the vehicle 1 relative to the earth's vertical based on the three projections measured by the inclination sensor 111.

The memory zone 112 is configured to store information. In particular, the memory zone 112 is configured to memorize reference ranges of the measurements of the three projections corresponding to the case where the vehicle 1 is stationary, with the stand 12 deployed.

Without modifying the stand 12, the vehicle 1 has the same angle of inclination θ each time it is in this configuration. The values of the three projections measured by the inclination sensor 111 are expected to be within the corresponding reference ranges, thus taking into account the effects of the inclination of the ground or a slight deformation of the stand 12, for example.

The electronic control unit 11 is configured to receive the measurements of the three projections of the inclination sensor 111.

The electronic control unit 11 is configured to compute a time derivative of each projection by subtracting two successive measurements and multiplying the result of the subtraction by a predetermined time constant.

The electronic control unit 11 is configured to compute the angle of inclination θ based on the measurements of the inclination sensor 111.

The electronic control unit 11 is configured to compare the computed angle of inclination θ with an inclination threshold θs.

The inclination threshold θs corresponds to the angle from which the electronic control unit 11 considers the vehicle 1 to be falling.

The electronic control unit 11 is configured to implement a function to stop the engine 10 of the vehicle 1 if the measured lateral angle of inclination θ is greater than the inclination threshold θs.

The electronic control unit 11 is configured to determine the contribution of the three axes of the inclination sensor 111 to the computation of the angle of inclination θ.

For each axis, this determination occurs by adding a predetermined value to the measured projection and then comparing the computed angle of inclination θ before and after adding the predetermined value. This predetermined value allows a movement of the one or more components of the inclination sensor 111 that measure this projection to be simulated.

If the difference is below a certain threshold, for example, 5°, then the axis is considered to be non-contributing. Conversely, if the difference is greater than the threshold, the axis is considered to be contributing.

The electronic control unit 11 is configured to send a warning message to the user of the vehicle 1 if a blockage of a component of the inclination sensor 111 is detected.

Stand 12

The stand 12 allows the vehicle 1 to have an additional support point to hold it in a stable position once deployed.

The stand 12 is configured to send signals to the electronic control unit 11 via the communication link 14 indicating whether or not the stand 12 is deployed.

In the example shown in the figures, the stand 12 is a side stand. When it is deployed, the stationary vehicle 1 rests on it and has a constant angle of inclination θ relative to the earth's vertical Z, as shown in FIG. 2.

In another embodiment, the stand 12 can be a central stand. When it is deployed, the stationary vehicle 1 rests on it and remains upright relative to the earth's vertical Z.

Communication Link 14

The communication link 14 allows communication between the electronic control unit 11, the engine 10 and the stand 12.

Preferably, the communication link 14 is a wired communication link.

Embodiment

The method according to the invention is automatically implemented in the vehicle 1 and occurs in two phases.

In a step E1, the electronic control unit 11 of the vehicle 1 is activated by an action by the user, such as, for example, turning a key of the vehicle 1.

The first phase is triggered following the step E1 and, in a step E2, the electronic control unit 11 receives a signal from the stand 12 indicating whether or not the stand 12 is deployed.

If the stand 12 is not deployed, the method is interrupted since the vehicle 1 is not in a reference position for the remainder of the method.

If the stand 12 is deployed, the electronic control unit 11 receives a signal from the engine 10 indicating whether or not the engine 10 is running in a step E3.

If the engine 10 is running during this step, the method is interrupted since the vehicle 1 is not in a reference position for the remainder of the method.

If the engine 10 is not running during this step, the electronic control unit 11 performs a self-diagnosis of the measurement of the inclination sensor 111 in a step E4.

The self-diagnosis is specific to the electronic control unit 11 and provides an initial check that the inclination sensor 111 is functioning correctly, but may not detect all faults and therefore must be redundant.

If the self-diagnosis detects a fault in the inclination sensor 111, the electronic control unit 11 deactivates the sending of the command to stop the engine 10 according to the angle of inclination θ of the vehicle 1 and sends a warning message to the user.

If the self-diagnosis does not detect a fault in the inclination sensor 111, the electronic control unit 11 determines the contribution of the measurement axes of the inclination sensor 111 in a step E5.

In this step, the electronic control unit 11 adds a predetermined value to the projection measured by the inclination sensor 111 for each axis and determines the variation in the computation of the angle of inclination θ that the addition of this imposed value involves.

If the variation is less than a certain threshold, for example, 5°, the corresponding axis is considered to be hardly contributing. If it is greater than this threshold, the axis is considered to be contributing. The contribution/non-contribution of each axis is stored in the memory zone 112.

Once the contribution of the axes has been determined, then, in a step E6, the electronic control unit 11 compares the measurements of the inclination sensor 111 along the three axes of the inclination sensor 111 with the reference ranges stored in the memory zone 112.

If the electronic control unit 11 determines that the measurements of the inclination sensor 111 are outside a reference range, an error in the measurement of the angle of inclination θ is detected.

If one of the measurements of a contributing axis is outside the reference range, the electronic control unit 11 deactivates the sending of the command to stop the engine 10 according to the angle of inclination θ of the vehicle 1 and sends a warning message to the user.

If only the measurement of a non-contributing axis is outside the reference range, the electronic control unit 11 does not deactivate the sending of the command to stop the engine 10 according to the angle of inclination θ of the vehicle 1, because the computation of the angle of inclination is only slightly affected by a blockage on this axis, but sends the user a warning concerning the problem in the vicinity of the inclination sensor 111.

If all the measurements of the inclination sensor 111 are within the reference range, the command to stop the engine 10 according to the angle of inclination θ of the vehicle 1 is still sent, and the method proceeds to the second phase.

In a step E7, the user of the vehicle 1 starts the engine 10 and the electronic control unit 11 receives a signal indicating that the engine 10 has been started.

Once the engine 10 is running, it generates vibrations that propagate in the vehicle 1 and notably reach the electronic control unit 11 and the inclination sensor 111, which affects the measurements of the projections.

In a step E8, the electronic control unit 11 computes the time derivative of each of the three projections.

The time derivative is computed by measuring the projections at regular time ranges, subtracting the previous measurement from a measurement and dividing the result of the subtraction by a predefined time constant.

If the time derivative is zero or below a predetermined threshold for a specified time, this indicates that despite the vibrations caused by the engine 10 running, the value of the corresponding projection measured by the inclination sensor 111 is constant. In this case, it is likely that the inclination sensor 111 has a fault and that a component measuring this projection is blocked.

Thus, when the time derivative is zero or below a predetermined threshold for a specified time, the electronic control unit 11 detects the blockage of a component of the inclination sensor 111 in a step E9.

A warning message is also sent to the user during this step in order to schedule the repair or the replacement of the inclination sensor 111.

If the measurement error is detected on the measurements of an axis considered to be contributing in step E5, the electronic control unit 11 deactivates the function for stopping the engine 10 according to the angle of inclination θ of the vehicle 1, because the blockage of a component of the inclination sensor 111 can then significantly affect the computation of the angle of inclination θ of the vehicle 1.

The method therefore allows a possible blockage to be detected in a redundant manner that could cause an error in determining the angle of inclination θ of the vehicle 1, involving the self-diagnosis of the electronic control unit 11, the comparison with the reference ranges when stationary, and the computation of the derivative of the measurements on each axis in a regular and simple manner that does not require any specific operation on the part of the user. The method also allows a command to stop the engine 10 and to warn the user of the vehicle 1 to be sent in the event that a blockage is detected.

The invention claimed is:

1. A method for detecting measurement errors in the lateral angle of inclination (θ) of a motorized two-wheeled vehicle (1), said vehicle (1) comprising an engine (10) and an electronic control unit (11), said electronic control unit (11) comprising an inclination sensor (111) and a memory zone (112), said memory zone (112) comprising reference inclination ranges, said electronic control unit (11) being configured to compute the lateral angle of inclination (θ) of the vehicle (1) based on the measurements of the inclination sensor (111), to compare the measured angle of inclination (θ) with a predetermined inclination threshold (θs) and to send a command to stop the engine (10) if the computed angle of inclination (θ) is greater than the inclination threshold (θs), said method comprising the steps of:

activating (E1) the electronic control unit (11) through an action by a user of the vehicle (1);

in a first phase, the electronic control unit (11) checking (E3) that the engine (10) of the vehicle (1) is stopped;

if the engine (10) is stopped, the electronic control unit (11) comparing (E6) the measurements of the inclination sensor (111) relative to the at least one reference inclination range;

if the electronic control unit (11) determines that the measurements of the inclination sensor (111) are outside the reference range, detecting an error in the measurement of the angle of inclination (θ) and the electronic control unit (11) deactivating the sending of the command to stop the engine (10) according to the angle of inclination (θ) of the vehicle (1) and warning the user;

in a second phase, starting (E7) the engine (10) of the vehicle (1) through an action by a user of the vehicle (1), and the electronic control unit (11) receiving notification of the engine (10) starting;

the electronic control unit (11) computing (E8) the variation in the measurements of the inclination sensor (111) when the engine (10) is running;

if the variation in the measurements of the inclination sensor (111) is below a predetermined threshold for a predetermined duration, detecting (E9) an error in the measurement of the angle of inclination (θ) and the electronic control unit (11) deactivating the function for stopping the engine (10) according to the angle of inclination (θ) of the vehicle (1) and warning the user.

2. The method as claimed in claim 1, wherein the measurements of the inclination sensor (111) involve projecting the earth's gravity on three axes, with the electronic control unit (11) being configured to compute the angle of inclination (θ) based on the three projections determined by the inclination sensor (111), and wherein:

the step of comparing the measurements of the inclination sensor (111) relative to the reference ranges is carried out on each of the three projections;

the step of computing the variation in the measurements of the inclination sensor (111) while the engine (10) is running is carried out on the computation of the variation in the measurement of each of the three projections; and the step of deactivating the function for stopping the engine according to the angle of inclination (θ) of the vehicle (1) is carried out if the variation in at least one projection is less than a predetermined threshold for a predetermined duration.

3. The method as claimed in claim 1, wherein a step (E5) of determining the contribution of each of the three axes to the measurement of the angle of inclination (θ) is carried out by the electronic control unit (11) before the step of comparing the measurements of the inclination sensor (111) with the reference ranges, wherein the step of deactivating the function for stopping the engine (10) according to the measurements of the inclination sensor (111) of the vehicle (1) and of warning the user is only carried out if the deviation of at least one projection of an axis determined as being a contributor relative to a corresponding reference value is greater than an error margin, or if the computation of the variation in the measurements of the inclination sensor (111) of at least one projection of an axis determined as being a contributor while the engine (10) is running is below a predetermined threshold for a predetermined duration.

4. The method as claimed in claim 1, wherein the reference ranges are measured and stored in the memory zone (112) of the electronic control unit (11) when the vehicle (1) is produced.

5. The method as claimed in claim 1, wherein the step (E8) of computing the variation in the measurements of the inclination sensor (111) is carried out based on the difference between two successive iterations of the measurements of the inclination sensor (111).

6. The method as claimed in claim 5, wherein the difference between two successive iterations of the measurements of the inclination sensor (111) is multiplied by a predefined time constant before the step of comparing with at least one reference value.

7. The method as claimed in claim 1, wherein the vehicle (1) comprises a retractable stand (12) and wherein a step (E2) of controlling the deployment of the stand (12) is carried out after activating (E1) the electronic control unit (11), the step of comparing the measurements of the inclination sensor (111) relative to at least one reference range is only carried out if the engine (10) is stopped and the stand (12) is deployed.

8. An electronic control unit (11) for a motorized two-wheeled vehicle (1), configured to be connected to the engine (10) of said vehicle and comprising an inclination sensor (111) and a memory zone (112), said memory zone (112) comprising at least one reference range, said electronic control unit (11) being configured to:

compute the lateral angle of inclination (θ) of the vehicle (1) based on the measurements of the inclination sensor (110) in order to compare the computed angle of inclination (θ) with a predetermined inclination threshold (θs);

send a signal to stop the engine (10) if the computed angle of inclination (θ) is greater than the inclination threshold (θs);

determine whether the engine (10) of the vehicle (1) is stopped or running;

compare the measurements of the inclination sensor (111) relative to the at least one reference range;

compute the variation in the measurements of the inclination sensor (111) while the engine (10) is running;

deactivate the sending of a signal to stop the engine (10) according to the angle of inclination (θ) of the vehicle (1) and send a warning to the user of the vehicle (1).

9. The electronic control unit (11) as claimed in claim 8, wherein the inclination sensor (111) is configured to automatically carry out a series of self-diagnostics.

10. A motorized two-wheeled vehicle (1) comprising an electronic control unit (11) as claimed in claim 8.

* * * * *